July 29, 1924.

A. H. BAIRD

UNIVERSAL CLAMP

Filed March 10, 1922

1,503,344

Inventor:
A. H. Baird
By Knight Bros.
Attys

Patented July 29, 1924.

1,503,344

UNITED STATES PATENT OFFICE.

ANDREW HAMILTON BAIRD, OF EDINBURGH, SCOTLAND.

UNIVERSAL CLAMP.

Application filed March 10, 1922. Serial No. 542,717.

*To all whom it may concern:*

Be it known that I, ANDREW HAMILTON BAIRD, British subject, and a resident of Edinburgh, Scotland, have invented certain new and useful Improvements in Universal Clamps, of which the following is a specification.

This invention relates to an improved universal clamp adaptable for many purposes and which may be used in connection with scientific apparatus and philosophical instruments where accuracy, rigidity and quick setting up is desired.

A further object of the invention is to provide an improved clamp which may be used as a bosshead, as a joint, as a hinge, or for extension rods and which will admit of universal movement controlled by a single screw.

A further object of the invention is to provide an improved clamp which will grip rods of either equal or different diameters, which can be practically instantaneously clamped or slackened whilst giving perfect rigidity in clamped position. The improved clamp will also grip rods, bars, laths or the like either of round or flat section.

In order that the invention may be more clearly understood reference is hereinafter made to the accompanying drawings illustrating my improved clamp adapted as a camera fitment.

Figure 1:
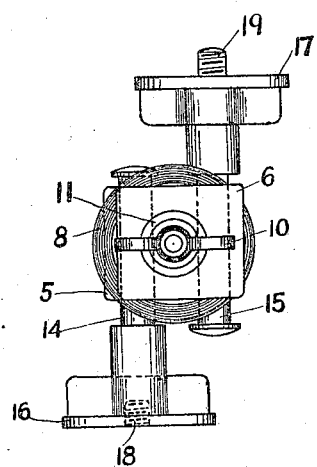
Fig. 1 is a side view of the camera fitment.
Figure 3:
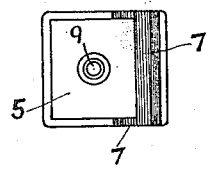
Fig. 3 is a view looking inside one of the blocks.
Figure 2:
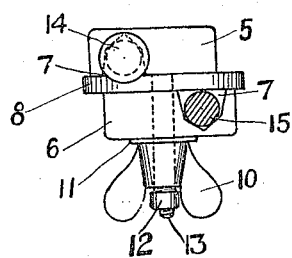
Fig. 2 is a plan thereof partly in section.
Figure 4:
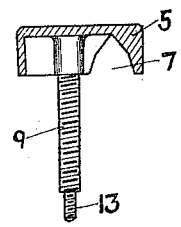
Fig. 4 is a sectional view of the block shown in Fig. 3.

In the construction illustrated on the drawings the clamp comprises a pair of blocks 5 and 6 each notched on one side to receive a bar of any convenient section. The notch 7 is preferably substantially V-shaped as clearly seen in Figs. 2 and 4 so that the block will grip a bar of circular section. A spacing member or washer 8 is interposed between the blocks 5 and 6 and the notches 7 in the blocks are directed towards the said spacing member. The block 5 forms the head of a bolt or screw 9 projecting therefrom through the spacing member 8 and through the block 6, said screw 9 being provided with a wing nut 10 adapted to bear against the block 7 or against a washer 11. A lock nut 12 may be provided on a reduced screw threaded portion 13 of the main screw 9. The blocks 5 and 6 may be solid, but are preferably hollow as shown in Figs. 3 and 4.

The block 5 is adapted to receive a bar 14 within the notch 7 whilst the block 6 is similarly adapted to receive a bar 15 within its notch, the bars 14 and 15 being clamped against the spacing member 8. In the construction illustrated the bars 14 and 15 terminate in flanges 16 and 17 respectively, the flange 16 being provided with an internally screw-threaded recess 18 which may be brought into screwed engagement with the usual screw of a camera stand. The flange 17 may be provided with a screw portion 19 adapted to fit the screwed recess which is usually provided in the base of a camera. By this arrangement the clamp illustrated on the drawings may be adapted for interpositioning between a camera and camera stand and enable the camera to be supported in any desired position.

It will be understood that the blocks 5 and 6 may be used to clamp any two rods of either the same diameter or of different diameters and that the blocks may each be caused to turn about the axis of a round bar into any desired position by slackening the nut 10.

I wish it to be understood that I do not limit myself to the particular construction shown on the drawings or to the application of this clamp to a camera fitment, but that the clamp may be adapted for clamping any two bars in any desired position.

It will be readily understood that the clamp may be designed for clamping together three or more bars by providing a notched block for each bar and interposing a spacing member 8 between each pair of blocks, the screw 9 being extended to pass through the whole of the blocks and spacing members.

Claims:

1. A universal clamp comprising the combination of a bolt, a head on said bolt, a block loose on said bolt, notches in the opposing inner faces of said bolt head and block, an unnotched loose rotatable disc between said bolt head and block and providing bearing surfaces common to both the head and block and a nut on said bolt for clamping the parts together.

2. A universal clamp as specified in claim 1 in which the notches each consist of four facets, two of which form a V-shaped groove whilst the other two form continuations thereof at a less divergent angle.

In testimony whereof I hereby affix my signature.

ANDREW HAMILTON BAIRD.